US012324937B2

(12) United States Patent
Squire

(10) Patent No.: US 12,324,937 B2
(45) Date of Patent: Jun. 10, 2025

(54) ANCHOR ASSEMBLY

(71) Applicant: Latchways plc, Devizes (GB)

(72) Inventor: Jacob Thackeray Squire, Devizes (GB)

(73) Assignee: Latchways plc, Dorset (GB)

( * ) Notice: Subject to any disclaimer, the term of this patent is extended or adjusted under 35 U.S.C. 154(b) by 0 days.

(21) Appl. No.: 18/264,124

(22) PCT Filed: Feb. 2, 2022

(86) PCT No.: PCT/GB2022/050269
§ 371 (c)(1),
(2) Date: Aug. 3, 2023

(87) PCT Pub. No.: WO2022/167788
PCT Pub. Date: Aug. 11, 2022

(65) Prior Publication Data

US 2024/0033547 A1 Feb. 1, 2024

(30) Foreign Application Priority Data

Feb. 5, 2021 (GB) ..................................... 2101596

(51) Int. Cl.
*F16M 11/00* (2006.01)
*A62B 35/00* (2006.01)
(Continued)

(52) U.S. Cl.
CPC .......... *A62B 35/0068* (2013.01); *A62B 35/04* (2013.01); *E04G 21/3214* (2013.01); *E04G 21/3285* (2013.01); *E04G 21/329* (2013.01)

(58) Field of Classification Search
CPC ................ A62B 35/0068; A62B 35/04; E04G 21/3214; E04G 21/3285; E04G 21/329; E04G 21/3204; E04G 21/3223
See application file for complete search history.

(56) References Cited

U.S. PATENT DOCUMENTS 2,765,139 A * 10/1956 White ....................... E04B 9/18 248/228.4
4,606,430 A * 8/1986 Roby ..................... A62B 35/04 182/36
(Continued)

FOREIGN PATENT DOCUMENTS

DE 202008006320 U1 7/2008
GB 2351337 A 12/2000
(Continued)

OTHER PUBLICATIONS

United Kingdom, Search Report for GB2101596.1 dated Nov. 5, 2021.
(Continued)

*Primary Examiner* — Amy J. Sterling
(74) *Attorney, Agent, or Firm* — Jones Day

(57) ABSTRACT

An anchor assembly, or mounting for an anchor assembly, particularly for a fall protection apparatus, has first and second mounting limbs connected to be rotatably mounted with respect to one another in order to rotate such that the limbs can be fixed in position at one of a variety of operational positions. The limbs have concentric engagement portions arranged to engage one another in order to permit rotation of the limbs about the rotation axis and inhibiting relative displacement of the limbs in a direction transverse to the rotational axis.

21 Claims, 6 Drawing Sheets

(51) Int. Cl.
*A62B 35/04* (2006.01)
*E04G 21/32* (2006.01)

(56) References Cited

U.S. PATENT DOCUMENTS

| | | | | | |
|---|---|---|---|---|---|
| 4,712,758 | A * | 12/1987 | Cuschera | F16M 11/42 248/188.7 |
| 5,143,171 | A * | 9/1992 | Glynn | A62B 35/04 52/27 |
| 5,739,449 | A * | 4/1998 | Torres, Jr. | G10D 13/28 248/188.7 |
| 6,053,279 | A * | 4/2000 | McKenna | A62B 35/0081 182/36 |
| 6,478,112 | B2 * | 11/2002 | Lee | A62B 35/0081 182/36 |
| 9,493,946 | B2 * | 11/2016 | Foderberg | E04C 5/162 |
| 10,487,511 | B2 * | 11/2019 | Lallier | E04G 21/3214 |
| 2008/0277557 | A1 * | 11/2008 | Vetesnik | E04G 21/329 248/499 |
| 2014/0130308 | A1 * | 5/2014 | Huang | A45F 5/02 24/301 |

FOREIGN PATENT DOCUMENTS

| | | | |
|---|---|---|---|
| GB | 2398599 | A | 8/2004 |
| IT | UB20154137 | A1 | 4/2017 |

OTHER PUBLICATIONS

Patent Cooperation Treaty, International Search Report for PCT/GB2022/050269, dated May 10, 2022.

* cited by examiner

ANCHOR ASSEMBLY

CROSS-REFERENCE TO RELATED APPLICATION

This application is a U.S. National Stage Application under 35 U.S.C. § 371 of International Patent Application No. PCT/GB2022/050269, filed Feb. 2, 2022, which claims priority to United Kingdom Patent Application No. 2101596.1, filed Feb. 5, 2021, the disclosures of which are incorporated by reference in their entireties.

BACKGROUND

Technical Field

The present disclosure relates to an anchor assembly and a mounting for an anchor assembly, and in particular to an anchor assembly and mounting for use in fall protection applications.

Technical Considerations

In certain situations, it is desired for an operative to work at height, for example, on the roof surface of a building. An example of an anchor fitted to a building is disclosed in, for example, DE10132297 which details a roof anchor for attachment to a standing seam roof of a building having struts that articulate about a threaded pin which is secured by a bolt. The arrangement can be articulated to different configurations to fit seam spacings of different distances. A similar device is disclosed in DE202007013157.

SUMMARY

An improved arrangement has now been devised.

In some non-limiting embodiments or aspects, the assembly may include first and second mounting limbs which are connected to be rotatably mounted with respect to one another in order to rotate about a rotation axis such that the limbs can be fixed in position at one of a plurality of operational positions. The limbs may have concentric engagement portions which are arranged to engage one another in order to permit rotation of the limbs about the rotation axis and also inhibit relative displacement of the limbs translationally in a direction transverse to the rotational axis.

In some non-limiting embodiments or aspects, the assembly provides that the limbs rotate one about another primarily in contact with one another on bearing surfaces of the limbs and lateral movement is inhibited.

In some non-limiting embodiments or aspects, a fixing bolt shaft or pin may extend through the limbs along the rotation axis to secure the limbs and also an anchor post (or other fall protection connection device) to the structure.

In some non-limiting embodiments or aspects, because the limbs rotate one about another primarily in contact with one another on bearing surfaces of the limbs and lateral movement is inhibited by this contact, lateral displacement of the device is less likely to cause detrimental engagement to the fixing bolt shaft or pin extending through the limbs.

In some non-limiting embodiments or aspects, the limbs may include an upper limb and a lower limb.

In some non-limiting embodiments or aspects, a concentric engagement portion of one of the limbs may be nested in engagement with the of the concentric engagement portion of the other of the limbs in order to permit rotation about the rotation axis and inhibiting relative displacement of the limbs translationally in a direction transverse to the rotational axis.

In some non-limiting embodiments or aspects, the concentric engagement portion of one of the limbs may in an embodiment comprise an at least part circular rib arranged to nest in a formation (such as an annular groove or circular aperture) comprising the concentric engagement formation of the other limb.

In some non-limiting embodiments or aspects, the concentric engagement formation of one of the limbs may comprise a substantially cylindrical or conical form surface projection upon which is nested a substantially cylindrical or conical form surface recess forming the concentric engagement portion of the other limb. A frustoconical form may be preferred to facilitate better nesting and bearing surface engagement.

In some non-limiting embodiments or aspects, each of the limbs may be provided with a central through aperture.

In some non-limiting embodiments or aspects, at least one of the limbs may include an aperture of dimension smaller than the aperture in the other.

In some non-limiting embodiments or aspects, the limbs may be fixed in position by means of a securing bolt, shaft or pin and/or such a securing bolt shaft or pin may be used to secure a post or other fall protection connection device to the structure.

In some non-limiting embodiments or aspects, each of the limbs may extend away from the concentric engagement portions in opposed directions, such that the device has an X shaped footprint in plan.

In some non-limiting embodiments or aspects, the ends of the limbs distanced from the concentric engagement portions may be provided with securing formations enabling securing to a substructure. Such securing formations may be rotatably, pivotably, or articulated connected to the limbs in order to account for different securing configurations on a specific structure.

In some non-limiting embodiments or aspects, the concentric engagement portions of the limbs may be raised relative to ends of the limbs distanced from the concentric engagement portions. This gives clearance under the device which may aid in securing of a through bolt during installation or for periodical maintenance.

In some non-limiting embodiments or aspects, the assembly may further include an anchor post (or other apparatus) supported above the concentric engagement portions.

In some non-limiting embodiments or aspects, an anchor assembly configured for use with a fall protection apparatus may include an upper limb and a lower limb each comprising a central engagement portion and a pair of elongate portions extending from the central engagement portion. The central engagement portion of the upper limb may be engagable with the central engagement portion of the lower limb such that the upper limb and the lower limb are rotatable relative to each other about a rotation axis extending through the central engagement portion of each of the upper limb and the lower limb. The central engagement portion of each of the upper limb and the lower limb may be configured to inhibit relative displacement of the limbs translationally in a direction transverse to the rotational axis.

In some non-limiting embodiments or aspects, the upper limb and the lower limb may be configured for rotating to one of a plurality of operational positions. The upper limb and the lower limb may be configured to be fixed in one of the plurality of operational positions. A support post may be connected to the upper limb and the lower limb, the support post having a securing bolt or shaft for fixing the upper limb and the lower limb in one of the plurality of operational positions.

In some non-limiting embodiments or aspects, the elongate portions of each of the upper limb and the lower limb may extend longitudinally in opposing directions from the central engagement portion.

In some non-limiting embodiments or aspects, the central engagement portion of each of the upper limb and the lower limb may have a frustoconical shape. The central engagement portion of one of the upper limb and the lower limb may be nested with the central engagement portion of the other of the upper limb and the lower limb. The central engagement portion of each of the upper limb and the lower limb may have a through aperture. The central engagement portion of each of the upper limb and the lower limb is raised relative to the elongate portions.

In some non-limiting embodiments or aspects, the central engagement portion of one of the upper limb and the lower limb may include an at least partly circular rib configured to nest with the central engagement portion of the other of the upper limb and the lower limb. The central engagement portion of one of the upper limb and the lower limb may include a substantially cylindrical or conical form surface projection upon configured to nest with a substantially cylindrical or conical form surface recess on the central engagement portion of the other of the upper limb and the lower limb.

In some non-limiting embodiments or aspects, each of the upper limb and the lower limb may include dished portions extending downwardly from opposed ends. Each of the dished portions may have an aperture configured for receiving a fixing element for securing the anchor assembly to a substructure.

In some non-limiting embodiments or aspects, the anchor assembly further may include an anchor structure connected to the upper limb and the lower limb. The anchor structure may have a connection ring. The anchor structure may have an energy absorber device.

In some non-limiting embodiments or aspects, an anchor assembly configured for use with a fall protection apparatus may include an upper limb and a lower limb each comprising a central engagement portion and a pair of elongate portions extending longitudinally away in opposing directions from the central engagement portion; and a support post connected to the upper limb and the lower limb. The central engagement portion of the upper limb may be engagable with the central engagement portion of the lower limb such that the upper limb and the lower limb are rotatable relative to each other to one of a plurality of operational positions about a rotation axis extending through the central engagement portion of each of the upper limb and the lower limb. The central engagement portion of each of the upper limb and the lower limb may be configured to inhibit relative displacement of the limbs translationally in a direction transverse to the rotational axis. The support post may be configured for fixing the upper limb and the lower limb to one of the plurality of operational positions.

In some non-limiting embodiments or aspects, the central engagement portion of each of the upper limb and the lower limb may be raised relative to the elongate portions. Each of the upper limb and the lower limb may include dished portions extending downwardly from opposed ends, wherein each of the dished portions may include an aperture configured for receiving a fixing element for securing the anchor assembly to a substructure. The anchor assembly further may include an anchor structure connected to the upper limb and the lower limb, wherein the anchor structure comprises a connection ring, and an energy absorber device.

Further non-limiting embodiments or aspects are set forth in the following numbered clauses:

Clause 1: An anchor assembly, or mounting for an anchor assembly, particularly for fall protection apparatus, the assembly comprising first and second mounting limbs connected to be rotatably mounted with respect to one another in order to rotate about a rotation axis such that the limbs can be fixed in position at one of a plurality of operational positions; the limbs having concentric engagement portions arranged to engage one another in order to permit rotation of the limbs about the rotation axis and inhibiting relative displacement of the limbs translationally in a direction transverse to the rotational axis.

Clause 2: The anchor assembly according to clause 1, wherein the limbs comprise an upper limb and a lower limb.

Clause 3: The anchor assembly according to clause 1 or 2, wherein a concentric engagement portion of one of the limbs is nested or seated in engagement with the concentric engagement portion of the other of the limbs in order to permit rotation about the rotation axis and inhibiting relative displacement of the limbs translationally in a direction transverse to the rotational axis.

Clause 4: The anchor assembly according to any of clauses 1-3, wherein the concentric engagement portion of one of the limbs comprises an at least part circular rib arranged to nest or seat in a formation comprising the concentric engagement formation of the other limb.

Clause 5: The anchor assembly according to any of clauses 1-4, wherein the concentric engagement formation of one of the limbs comprises a substantially cylindrical or conical form surface projection upon which is nested or seated a substantially cylindrical or conical form surface recess forming the concentric engagement portion of the other limb.

Clause 6: The anchor assembly according to any of clauses 1-5, wherein each of the limbs is provided with a central through aperture.

Clause 7: The anchor assembly according to any of clauses 1-6, wherein at least one of the limbs includes an aperture of dimension smaller than the aperture in the other.

Clause 8: The anchor assembly according to any of clauses 1-7, wherein the limbs are fixed in position by means of a securing bolt or shaft.

Clause 9: The anchor assembly according to any of clauses 1-8, wherein each of the limbs extends away from the concentric engagement portions.

Clause 10: The anchor assembly according to any of clauses 1-9, wherein ends of the limbs distanced from the concentric engagement portions are provided with securing formations enabling securing to a substructure.

Clause 11: The anchor assembly according to any of clauses 1-10, wherein the concentric engagement portions of the limbs are raised or elevated relative to ends of the limbs distanced from the concentric engagement portions.

Clause 12: The anchor assembly according to any of clauses 1-11, further comprising an anchor structure supported above the concentric engagement portions.

Clause 13: The anchor assembly according to any of clauses 1-12, wherein the anchor structure is a post.

Clause 14: The anchor assembly according to any of clauses 1-13, further comprising a connection device for connecting to a fall protection apparatus such as a safety line or personal protection lifeline.

Clause 15: The anchor assembly according to any of clauses 1-14, wherein the anchor structure is provided with an energy absorber system or device.

Clause 16: An anchor assembly configured for use with a fall protection apparatus, the anchor assembly comprising: an upper limb and a lower limb each comprising a central engagement portion and a pair of elongate portions extending from the central engagement portion, wherein the central engagement portion of the upper limb is engagable with the central engagement portion of the lower limb such that the upper limb and the lower limb are rotatable relative to each other about a rotation axis extending through the central engagement portion of each of the upper limb and the lower limb, and wherein the central engagement portion of each of the upper limb and the lower limb is configured to inhibit relative displacement of the limbs translationally in a direction transverse to the rotational axis.

Clause 17: The anchor assembly according to clause 16, wherein the upper limb and the lower limb are configured for rotating to one of a plurality of operational positions.

Clause 18: The anchor assembly according to clause 16 or 17, wherein the upper limb and the lower limb are configured to be fixed in one of the plurality of operational positions.

Clause 19: The anchor assembly according to any of clauses 16-18, further comprising a support post connected to the upper limb and the lower limb, the support post having a securing bolt or shaft for fixing the upper limb and the lower limb in one of the plurality of operational positions.

Clause 20: The anchor assembly according to any of clauses 16-19, wherein the elongate portions of each of the upper limb and the lower limb extend longitudinally in opposing directions from the central engagement portion.

Clause 21: The anchor assembly according to any of clauses 16-20, wherein the central engagement portion of each of the upper limb and the lower limb has a frustoconical shape.

Clause 22: The anchor assembly according to any of clauses 16-21, wherein the central engagement portion of one of the upper limb and the lower limb is nested with the central engagement portion of the other of the upper limb and the lower limb.

Clause 23: The anchor assembly according to any of clauses 16-22, wherein the central engagement portion of each of the upper limb and the lower limb has a through aperture.

Clause 24: The anchor assembly according to any of clauses 16-23, wherein the central engagement portion of each of the upper limb and the lower limb is raised relative to the elongate portions.

Clause 25: The anchor assembly according to any of clauses 16-24, wherein the central engagement portion of one of the upper limb and the lower limb comprises an at least partly circular rib configured to nest with the central engagement portion of the other of the upper limb and the lower limb.

Clause 26: The anchor assembly according to any of clauses 16-25, wherein the central engagement portion of one of the upper limb and the lower limb comprises substantially cylindrical or conical form surface projection upon configured to nest with a substantially cylindrical or conical form surface recess on the central engagement portion of the other of the upper limb and the lower limb.

Clause 27: The anchor assembly according to any of clauses 16-26, wherein each of the upper limb and the lower limb comprises dished portions extending downwardly from opposed ends.

Clause 28: The anchor assembly according to any of clauses 16-27, wherein each of the dished portions comprises an aperture configured for receiving a fixing element for securing the anchor assembly to a substructure.

Clause 29: The anchor assembly according to any of clauses 16-28, further comprising an anchor structure connected to the upper limb and the lower limb.

Clause 30: The anchor assembly according to any of clauses 16-29, wherein the anchor structure comprises a connection ring.

Clause 31: The anchor assembly according to any of clauses 16-30, wherein the anchor structure comprises an energy absorber device.

Clause 32: An anchor assembly configured for use with a fall protection apparatus, the anchor assembly comprising: an upper limb and a lower limb each comprising a central engagement portion and a pair of elongate portions extending longitudinally away in opposing directions from the central engagement portion; and a support post connected to the upper limb and the lower limb, wherein the central engagement portion of the upper limb is engagable with the central engagement portion of the lower limb such that the upper limb and the lower limb are rotatable relative to each other to one of a plurality of operational positions about a rotation axis extending through the central engagement portion of each of the upper limb and the lower limb, wherein the central engagement portion of each of the upper limb and the lower limb is configured to inhibit relative displacement of the limbs translationally in a direction transverse to the rotational axis, and wherein the support post is configured for fixing the upper limb and the lower limb to one of the plurality of operational positions.

Clause 33: The anchor assembly according to clause 32, wherein the central engagement portion of each of the upper limb and the lower limb is raised relative to the elongate portions.

Clause 34: The anchor assembly according to clause 32 or 33 wherein each of the upper limb and the lower limb comprises dished portions extending downwardly from opposed ends, and wherein each of the dished portions comprises an aperture configured for receiving a fixing element for securing the anchor assembly to a substructure.

Clause 35: The anchor assembly according to any of clauses 32-34, further comprising an anchor structure connected to the upper limb and the lower limb, wherein the anchor structure comprises a connection ring, and an energy absorber device.

BRIEF DESCRIPTION OF THE DRAWINGS

The disclosure will now be further described, by way of example only, with reference to the accompanying drawings, in which.

Figure 1:
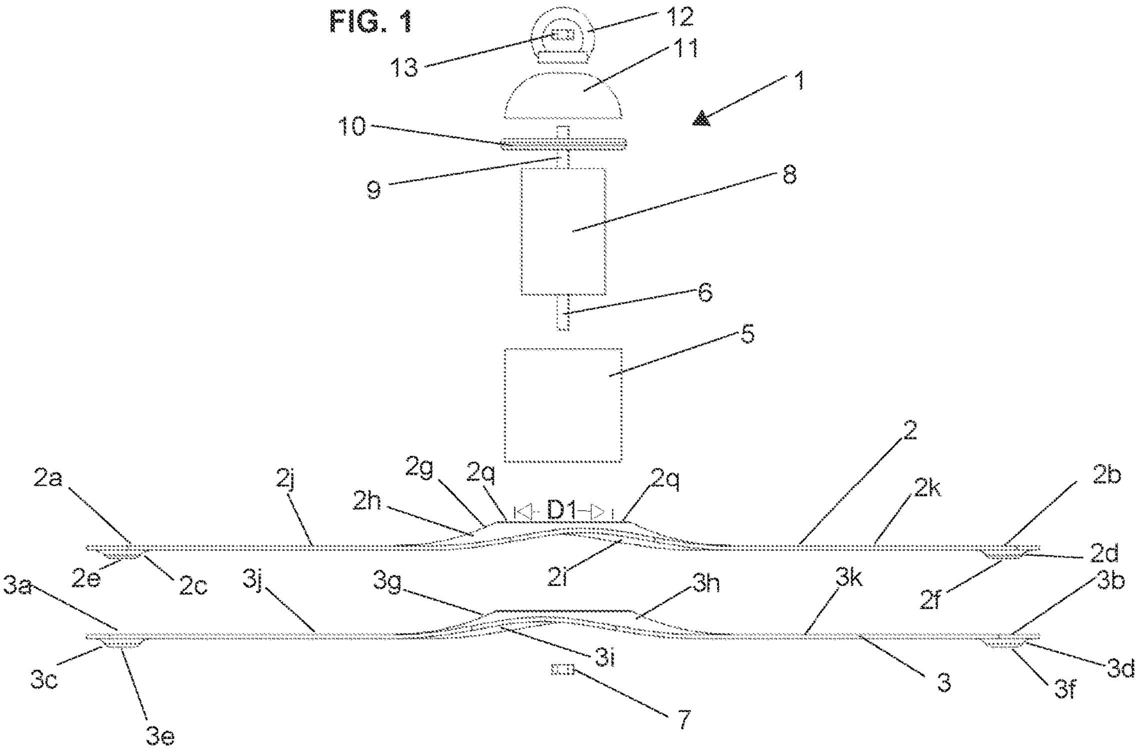
FIG. 1 is an exploded side view of a non-limiting embodiment or aspect of an assembly according to the principles of the present disclosure.
Figure 2:
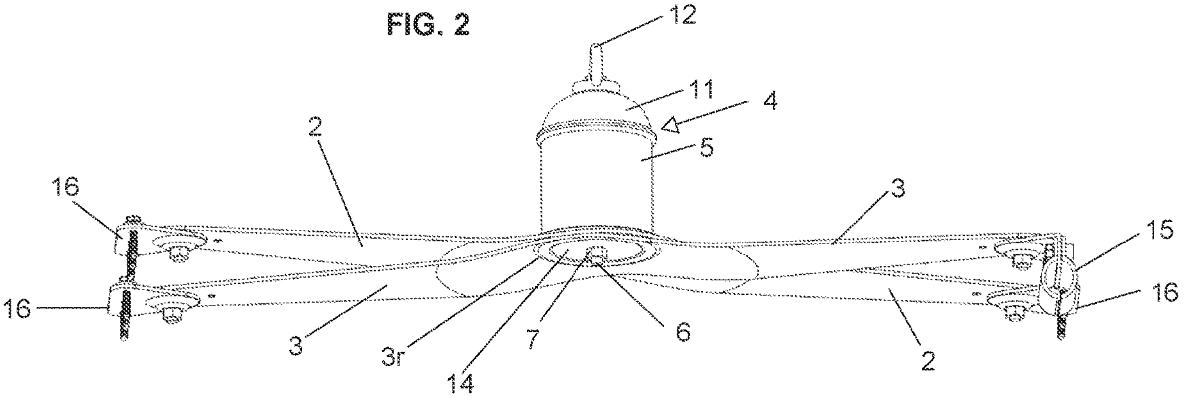
FIG. 2 is a perspective view of the assembly of FIG. 1 from the underside.
Figure 3:
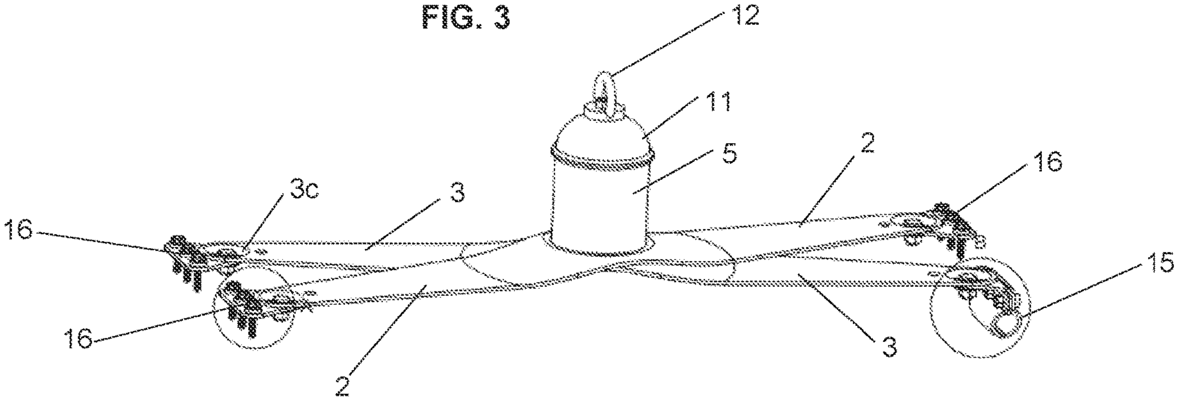
FIG. 3 is a perspective view of the assembly of the preceding figures from above.

It will be appreciated that FIGS. 1-13 are schematic drawings and features are not necessarily drawn to scale.

DETAILED DESCRIPTION

As used herein, the singular form of "a", "an", and "the" include plural referents unless the context clearly dictates otherwise. Spatial or directional terms, such as "left", "right", "inner", "outer", "above", "below", and the like, relate to the embodiments or aspects as shown in the drawing figures and are not to be considered as limiting as the embodiments or aspects can assume various alternative orientations. All numbers used in the specification and claims are to be understood as being modified in all instances by the term "about" or "approximately". By "about" or "approximately" is meant within plus or minus twenty-five percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements. All documents referred to herein are "incorporated by reference" in their entirety. The term "at least" is synonymous with "greater than or equal to".

As used herein, "at least one of" is synonymous with "one or more of". For example, the phrase "at least one of A, B, or C means any one of A, B, or C, or any combination of any two or more of A, B, or C. For example, "at least one of A, B, and C" includes A alone; or B alone; or C alone; or A and B; or A and C; or B and C; or all of A, B, and C. The word "comprising" and "comprises", and the like, does not exclude the presence of elements or steps other than those listed in any claim or the specification as a whole. In the present specification, "comprises" means "includes" and "comprising" means "including".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values. As used herein, the terms "perpendicular", "transverse", "substantially perpendicular", or "substantially transverse" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

The discussion of various embodiments or aspects may describe certain features as being "particularly" or "preferably" within certain limitations (e.g., "preferably", "more preferably", or "even more preferably", within certain limitations). It is to be understood that the disclosure is not limited to these particular or preferred limitations but encompasses the entire scope of the various embodiments and aspects described herein. The disclosure comprises, consists of, or consists essentially of, the following embodiments or aspects, in any combination. Various embodiments or aspects of the disclosure are illustrated in separate drawing figures. However, it is to be understood that this is simply for ease of illustration and discussion. In the practice of the disclosure, one or more embodiments or aspects shown in one drawing figure can be combined with one or more embodiments or aspects shown in one or more of the other drawing figures.

Referring to the drawings, and initially to FIG. 1, in some non-limiting embodiments or aspects, an anchor assembly 1 includes an upper limb 2 and a lower limb 3. Upper limb 2 includes opposed ends 2*a* and 2*b* which include dished portions 2*c* 2*d* extending downwardly from the general plane of the plate form limb 2. The dished portions 2*c* 2*d* are provided with through holes 2*e* 2*f* which enable either direct fixing of the limb to a substructure (e.g. using bolts) or articulated connection to a fixing 15 or 16 such as those shown in FIGS. 4-5. Upper limb 2 also includes a frustoconical raised section 2*g* having a frustoconical upper surface 2*h* and a frustoconical recess surface 2*i*. Planar elongate plate portions 2*j* 2*k* of the limb extend longitudinally in opposed directions from the central frustoconical portion 2*g* to their respective ends 2*a* 2*b*. The frustoconical portion 2*g* is provided with a through aperture diameter D1 which is less than the diameter of the post 5, such that the post can abut against the marginal annulus surface 2*q*.

In some non-limiting embodiments or aspects, lower limb 3 is similar to the upper limb and includes opposed ends 3*a* and 3*b* which include dished portions 3*c*, 3*d* extending downwardly from the general plane of the plate form limb 3. The dished portions 3*c*, 3*d* are provided with through holes 3*e*, 3*f* which enable either direct fixing of the limb to a substructure (e.g. using bolts) or articulated connection to a fixing 15 or 16 such as those shown in FIGS. 4-5. Lower limb 3 also includes a frustoconical raised section 3*g* having a frustoconical upper surface 3*h* and a frustoconical recess surface 3*i*. Planar elongate plate portions 3*j*, 3*k* extend longitudinally in opposed directions from the central frustoconical portion 3*g* to their respective ends 3*a*, 3*b*. The frustoconical portion 3*g* is provided with a through aperture 3*r* (FIG. 2) the diameter of which is slightly larger than the diameter D1.

In some non-limiting embodiments or aspects, the elongate limbs 2 and 3 are assembled such that the outer frustoconical surface 3*h* of limb 3 is nested internally of the frustoconical recess of limb 2 bearing against the frustoconical recess surface 2*i*. The mounting limbs 2, 3 are rotatable with respect to one another in order to rotate about a rotation axis such that the limbs can be fixed in position at one of a plurality of operational positions. The frustoconical portions of the limbs 2, 3 act as concentric engagement portions arranged to engage one another in order to permit rotation of the limbs 2, 3 about the rotation axis and inhibiting relative displacement of the limbs translationally in a direction transverse to the rotational axis.

In some non-limiting embodiments or aspects, a support post 4 is mounted to the limb assembly 2, 3 by means of a nut 7 connecting to a threaded end of a shaft 6. The nut abuts against a force spreader disc 14 (shown in FIG. 2) which is larger than the diameter D1 and therefore abuts against the underside of the marginal annulus 2*q* of upper limb 2. The post is thereby secured to the upper limb 2. The upper end of the post 4 has a connection ring 12 which is secured to the threaded end of shaft 9 by means of nut 13. The connection ring can be secured directly to the carabiner of a lifeline connected to the harness of an operative. Alternatively, the connection ring can constrain a horizontal fixed safety line to which an operative can connect via a lifeline connected to the harness.

In some non-limiting embodiments or aspects, disposed internally of the posts cylinder wall 5 is an energy absorber device 8. The energy absorber device 8 is connected to the shafts 6 and 9. When the energy absorber deploys, as a result of a force greater than a predetermined level acting upwardly (or to the side), the connection ring 12 moves away from the dome 11 of the post as the shaft 9 is pulled. The energy absorber device may be of any one or a combination of devices well known in the art and may, for example, comprise a plastically deformable metal coil that undergoes plastic deformation and lengthens as the force is applied at the correct level. A seal ring 10 is provided between the cylinder wall 5 and upper dome 11.

Figure 4:
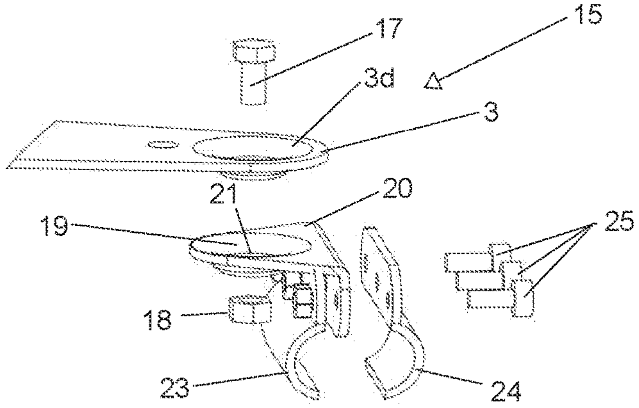
FIG. 4 is a perspective view of a non-limiting embodiment or aspect of a detail part that can form a part of the assembly of the preceding figures.
Figure 5:
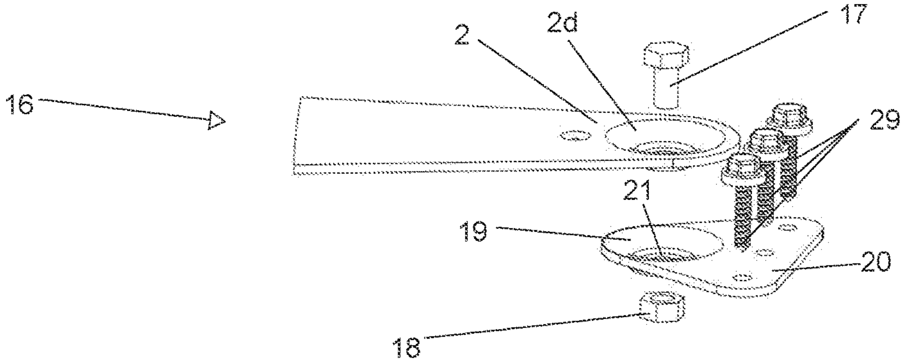
FIG. 5 is a perspective view of a non-limiting embodiment or aspect of detail part that can form a part of the assembly of the preceding figures.

FIGS. 4-5 show alternative way of connection for the assembly to differing subsurface structures. In both cases, the fixings 15, 16 are secured to the opposed ends 2*a*, 2*b*, 3*a*, 3*b* via the apertures in the dished portions 2*c*, 2*d*, 3*c*, 3*d* extending downwardly from the general plane of the plate form limb 2, 3. A fixing bolt 17 and nut is used passing through an aperture 21 in a dished portion 19 of a connector plate 20. The dished portion 19 of the connector plate 20 receivingly mates or nests with the downward portion of the dished portions 2*c*, 2*d*, 3*c*, 3*d*. The connector plates 20 are articulated to the limbs 2, 3 and pivotal about the axis of the bolts 17, to enable connection at different angles dependent upon the particular substructure geometry.

In some non-limiting embodiments or aspects, the fixing 15 includes clamping plates 23, 24 which are secured to the connector plate 20 by means of bolts 25. This fixing can be used to secure the assembly to the seams 27 of a seam roof 28 as shown in FIGS. 6-7.

Figure 8:
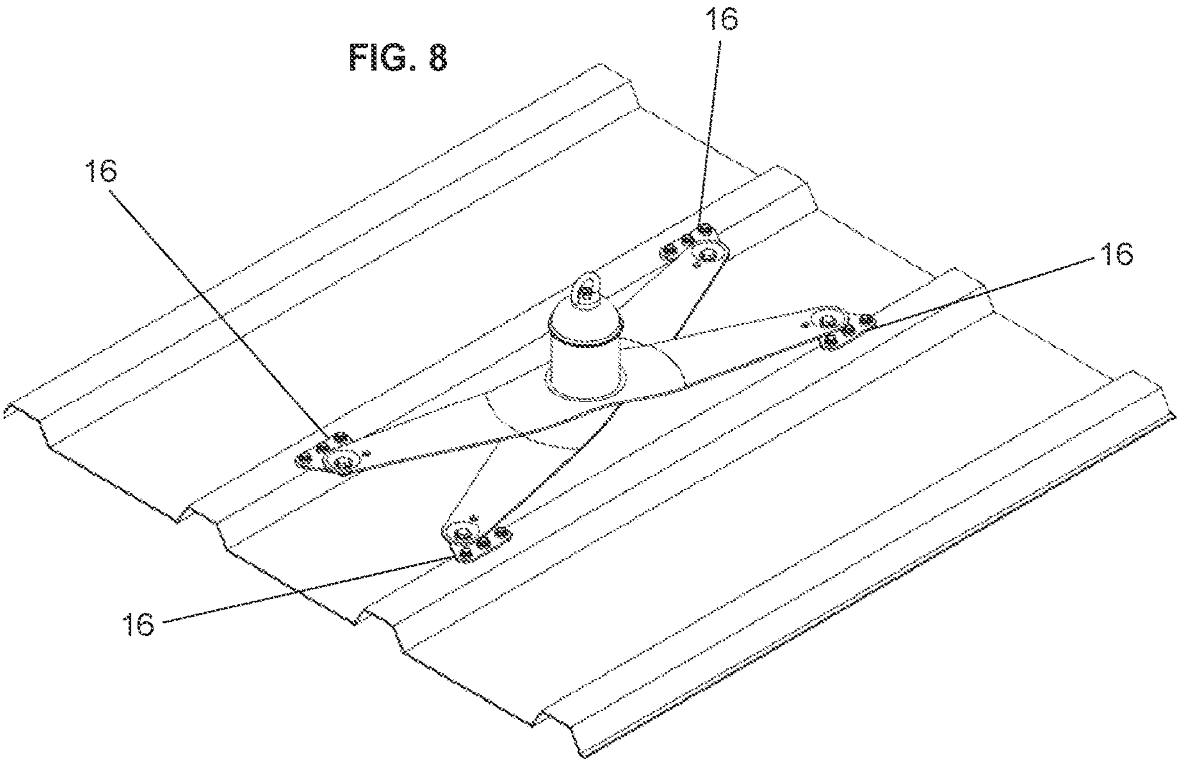
FIG. 8 is a perspective view of a non-limiting embodiment or aspect of an assembly of the preceding figures fixed to a profiled roof.
Figure 9:
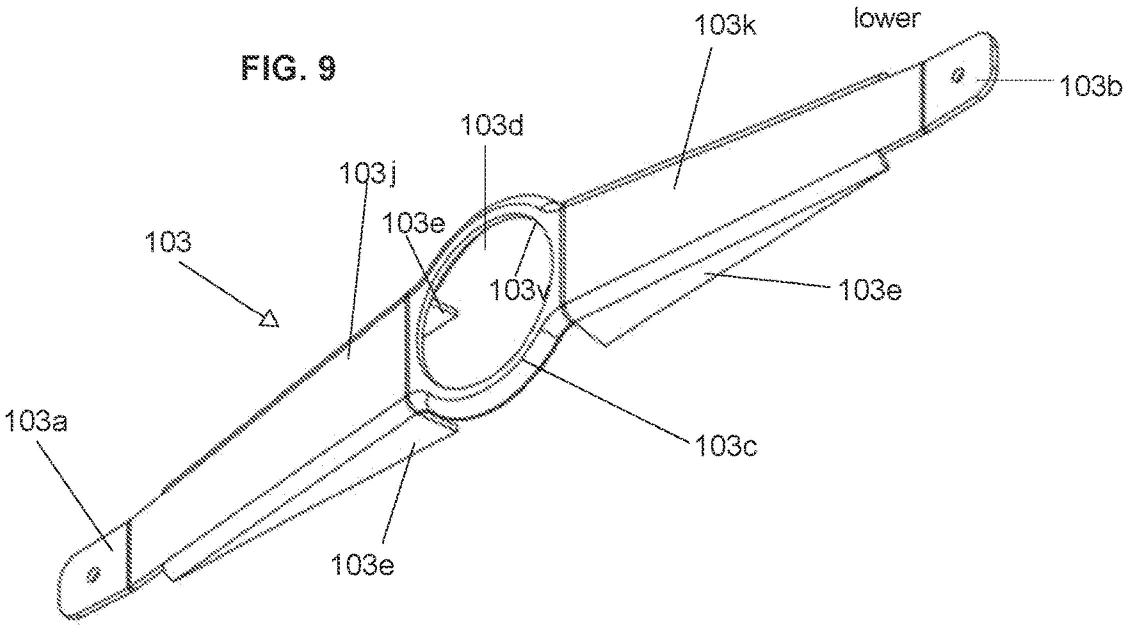
FIGS. 9-10 are perspective views of parts of a non-limiting embodiment or aspect of an alternative configuration of an assembly according to the principles of the present disclosure.
Figure 10:
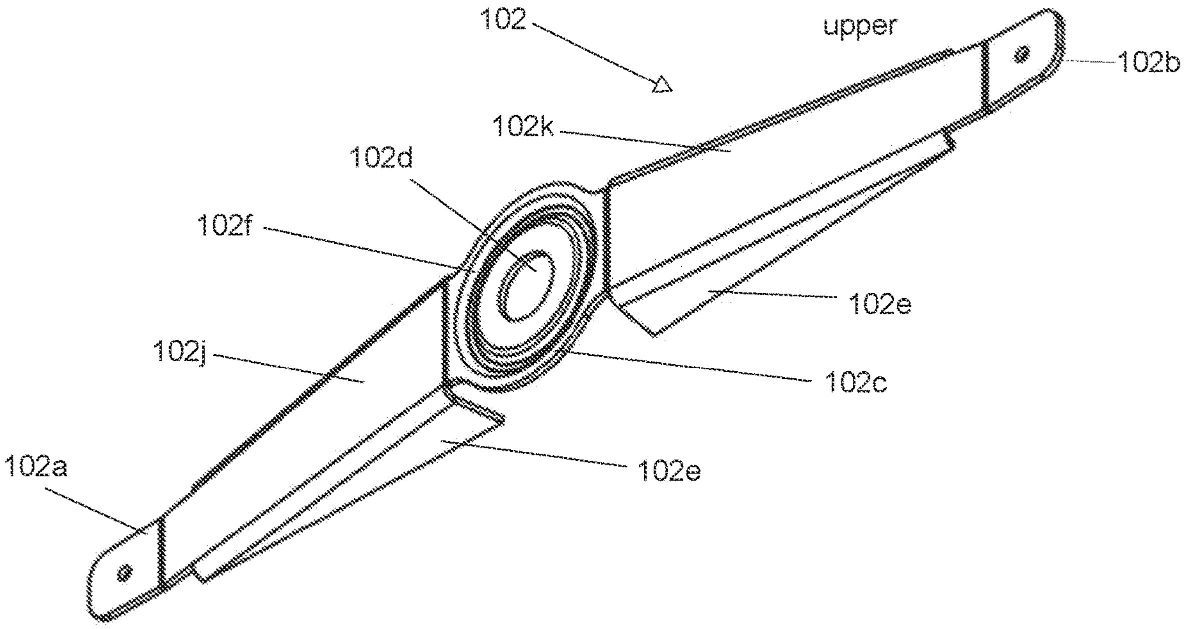
Figure 11:
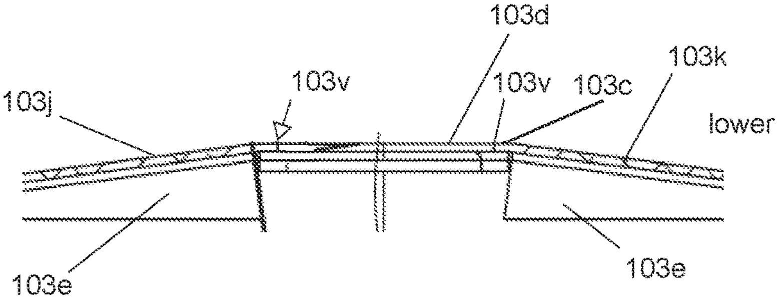
FIGS. 11-12 are detailed views of the portions of FIGS. 9-10.
Figure 12:
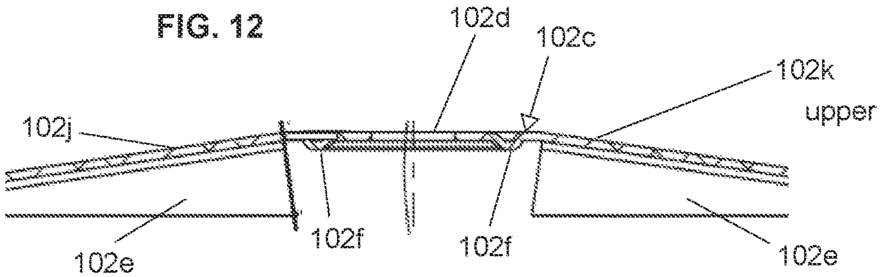

In some non-limiting embodiments or aspects, the fixing 16 carries screws 29 which tap through apertures in the connector plate 20 to be screwed directly into the skin of a profiled sheet substructure as shown in FIG. 8.

Figure 6:
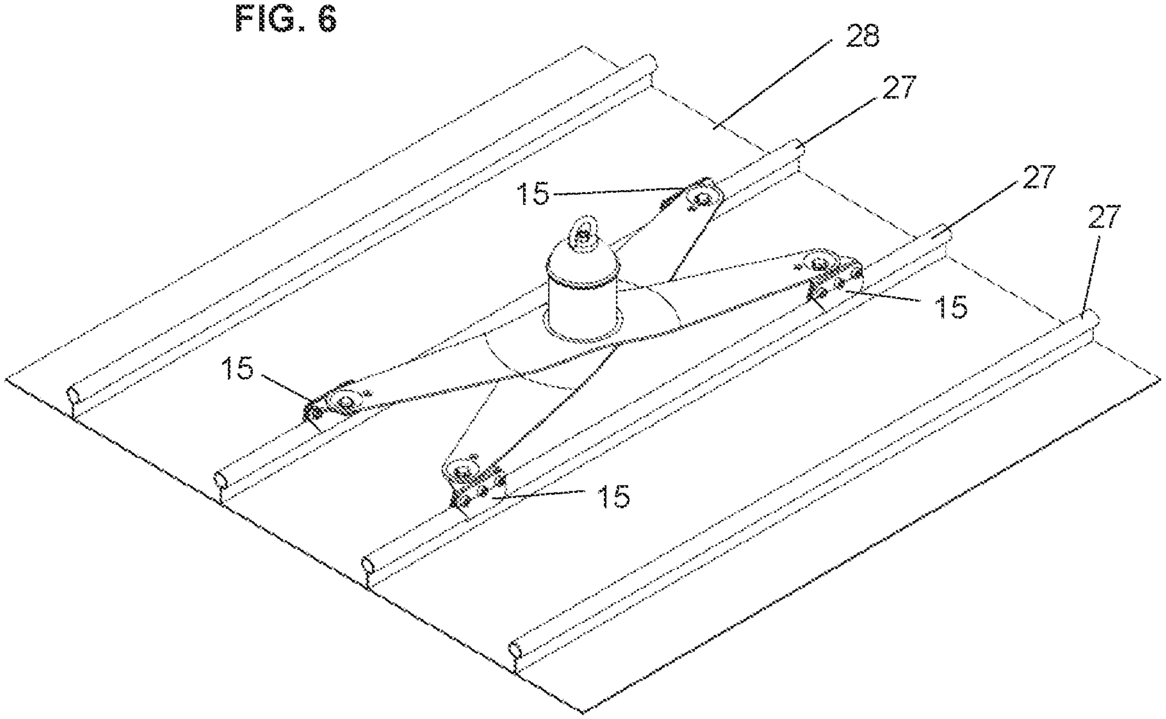
FIG. 6 is a perspective view of a non-limiting embodiment or aspect of a device of the assembly of the preceding figures fixed to a seamed roof.
Figure 7:
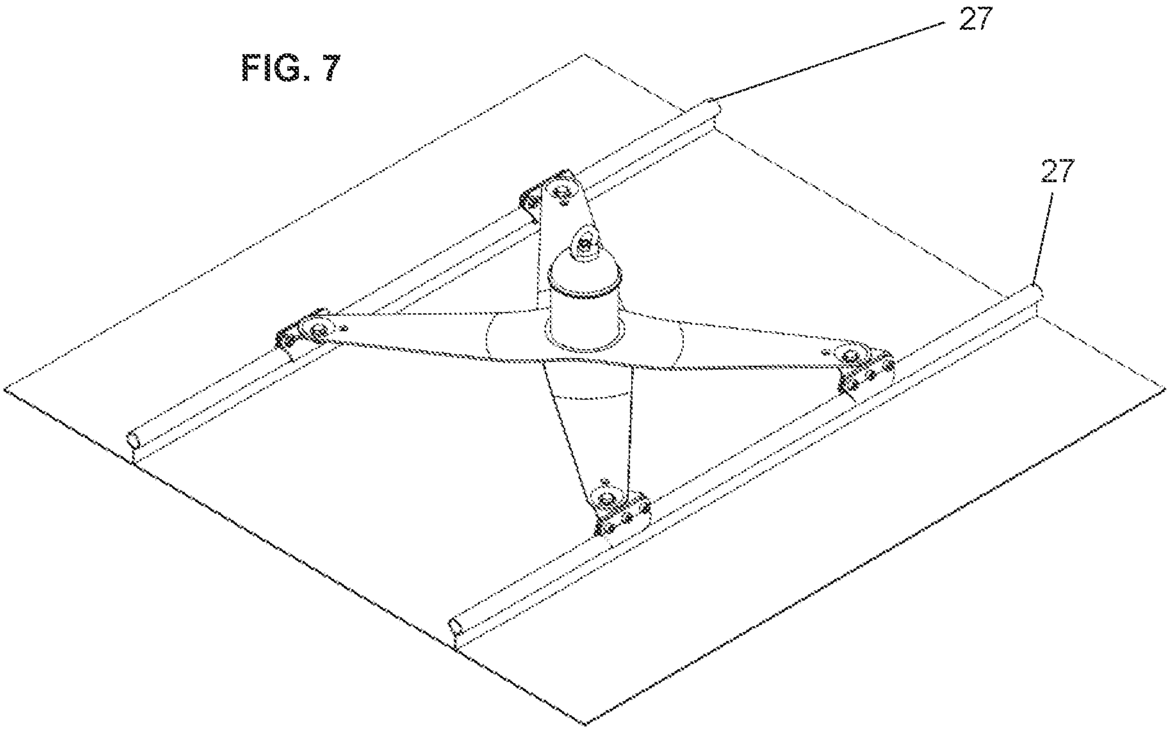
FIG. 7 is a perspective view of a non-limiting embodiment or aspect of an assembly of the preceding figures fixed to a seamed roof in an alternative configuration to FIG. 6.

In some non-limiting embodiments or aspects, by comparison of FIGS. 6 and 7, it can be seen how the anchor assembly can be re-orientated by articulation of the mounting limbs 2, 3 with respect to one another about a rotation axis such that the limbs can be fixed in position at one of a plurality of operational positions. The relatively narrowly spaced seams 27 in FIG. 6 and the relatively more widely spaced seams 27 in FIG. 7.

In some non-limiting embodiments or aspects, the frustoconical portions of the limbs 2, 3 act as concentric engagement portions arranged to engage one another in order to permit rotation of the limbs 2, 3 about the rotation axis and inhibiting relative displacement of the limbs translationally in a direction transverse to the rotational axis. The assembly, as described, provides that the limbs rotate one about another primarily in contact with one another on bearing surfaces of the limbs and lateral movement is inhibited. Because lateral movement is inhibited by this contact, lateral displacement of the device is less likely to cause detrimental engagement to the threaded fixing shaft 6 extending through the limbs. Reducing this risk of damage is important, particularly where the shaft 6 is connected to an energy absorber system 8. Furthermore, when the assembly is fixed in place the bearing surfaces of the frustoconical portions of the limbs provide enhanced rigidity and structural integrity to the anchor assembly in the event of a fall event.

Referring now to FIGS. 9-13, an alternative embodiment of anchor assembly is shown. In this embodiment, again the limbs 103, 102 rotate one about/on another primarily in contact with one another on bearing surfaces of the limbs and lateral movement is inhibited, by the mounting contact. However, in this embodiment this is achieved without using the frustoconical mounting system of the first embodiment.

Figure 13:
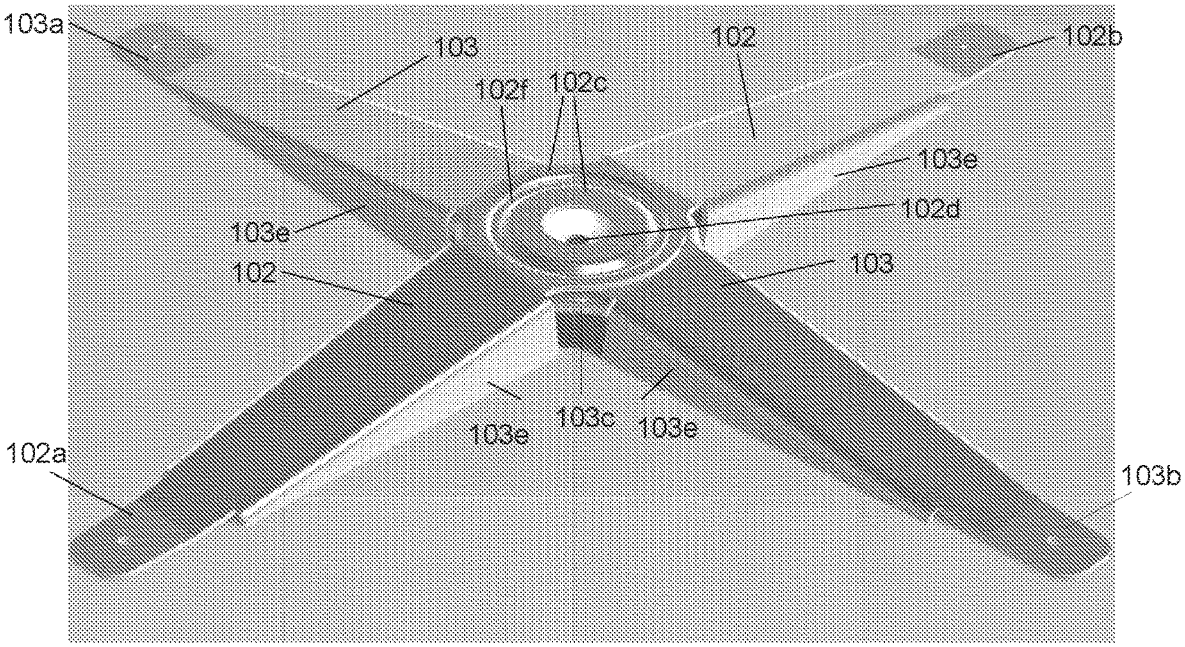
FIG. 13 is a perspective view of the non-limiting embodiments or aspects of FIGS. 9-12.

FIG. 13 shows the general limb assembly. The mounting post and energy absorber systems are not shown, but it should readily be understood that an assembly mounting the shock absorber and/or post of the first embodiment could equally be mounted to this assembly embodiment.

In some non-limiting embodiments or aspects, the limb assembly includes an upper limb 102 and a lower limb 103. The lower limb comprises a central collar 103*c* having a central aperture 103*d*. The limb 103 has elongate plate portions 103*j* and 103*k* which incline downwardly away from the central collar towards distal fixing ends 103*a*, 103*b*. The central collar 103*c* is raised or elevated with respect to the distal fixing ends 103*a*, 103*b*. The plate portions 103*j*, 103*k*, have transversely extending flank portions 103*e* to add rigidity to the assembly.

In some non-limiting embodiments or aspects, the upper limb 102 includes a central annulus 102*c* having a central aperture 102*d*. The limb 102 has elongate plate portions 102*j* and 102*k* which incline downwardly away from the central annulus towards distal fixing ends 102*a*, 102*b*. The central collar 102*c* is raised or elevated with respect to the distal fixing ends 102*a*, 102*b*. The plate portions 102*j*, 102*k*, have transversely extending flank portions 102*e* to add rigidity to the assembly. The central aperture 102*d* allows a fixing bolt or shaft to pass through the assembly.

In this embodiment or aspect, again the coupling of the limbs 103, 102 constrained to rotate with respect to or about one another in primary guided rotation is achieved by the coupling connection and interaction between the central annulus 102*c* of the upper limb 102 and the central aperture 103*c* of the lower limb 103. This interaction provides the contact with one another on bearing surfaces of the limbs and lateral movement is inhibited, by the mounting contact.

In some non-limiting embodiments or aspects, the central annulus 102*c* of the upper limb 102 has a downwardly projecting annular rib 102*f* which seats or nests in the central aperture 103*d* of the central collar 103*c* of the upper limb 103. The downwardly projecting annular rib 102*f* has bearing contact with the edge 103*v* of the aperture 103*d*, as the limbs rotate relative to one another, and the presence of the rib 102*f* in bearing contact with circular edge 103*v*, guides the rotary movement and ensures that the contact with one another is on bearing surfaces of the limbs and lateral movement of the limbs is inhibited, by the mounting contact.

In some non-limiting embodiments or aspects, each limb has portions extending away from the mid-point hub formed by the frustoconical mounting feature of the first embodiment or the central collar and annulus of the second embodiment. This gives four fixing points at the end of the respective limbs (2 on each limb). As an alternative, the limbs could terminate at one end at the hub formed by the frustoconical mounting feature of the first embodiment or the central collar and annulus of the second embodiment. In this way, four separate limbs could be mounted to provide a further embodiment of mounting system. In this embodiment each of the four limbs would provide a single fixing point at the single end of the limb distal from the hub provided with the frustoconical mounting feature of the first embodiment or the central collar and annulus of the second embodiment.

It should be noted that the above-mentioned embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The mere fact that certain measures are recited in mutually different dependent claims does not indicate that a combination of these measures cannot be used to advantage.

The invention claimed is:

1. An anchor assembly comprising:

an upper limb and a lower limb each comprising a central engagement portion having a bearing surface;

wherein the central engagement portion of one of the upper limb and the lower limb is engagable with the central engagement portion of the other of the upper limb and the lower limb such that the upper limb and the lower limb are rotatable relative to each other about a rotation axis extending through the central engagement portion of each of the upper limb and the lower limb; and wherein the central engagement portions are configured such that their bearing surfaces while engaged are at least partially raised relative to the general planes of the engaged limbs, the bearing surfaces configured to partially constrain rotation of the engaged limbs with respect to each other.

2. The anchor assembly according to claim 1, wherein the upper limb and the lower limb are configured to rotate to one of a plurality of operational positions, and to be fixed in at least one of the plurality of operational positions.

3. The anchor assembly according to claim 2, further comprising a support post connected to the upper limb and the lower limb, the support post having a securing bolt or shaft for fixing the upper limb and the lower limb in at least one of the plurality of operational positions.

4. The anchor assembly according to claim 1, wherein each of the limbs further comprises a pair of elongate portions that extend longitudinally in opposing directions from the central engagement portion.

5. The anchor assembly according to claim 1, wherein the central engagement portion of at least one of the upper limb and the lower limb has a frustoconical shape.

6. The anchor assembly according to claim 1, wherein the central engagement portion of one of the upper limb and the lower limb is nested with the central engagement portion of the other of the upper limb and the lower limb.

7. The anchor assembly according to claim 1, wherein the central engagement portion of each of the upper limb and the lower limb has a through aperture.

8. The anchor assembly according to claim 6, wherein the central engagement portion of one of the upper limb and the lower limb comprises an at least partly circular rib.

9. The anchor assembly according to claim 6, wherein the central engagement portion of one of the upper limb and the lower limb comprises a substantially cylindrical or conical form surface projection.

10. The anchor assembly according to claim 4, wherein each of the upper limb and the lower limb comprises dished portions extending from opposed ends of the pair of elongate portions.

11. The anchor assembly according to claim 10, wherein each of the dished portions comprises an aperture configured for receiving a fixing element for securing the anchor assembly to a substructure.

12. The anchor assembly according to claim 1, further comprising an anchor structure connected to the upper limb and the lower limb.

13. The anchor assembly according to claim 12, wherein the anchor structure comprises a connection ring.

14. The anchor assembly according to claim 12, wherein the anchor structure comprises an energy absorber device.

15. An anchor assembly comprising:

an upper limb and a lower limb each comprising a central engagement portion having a bearing surface and a pair of elongate portions extending longitudinally away in opposing directions from the central engagement portion;

wherein the central engagement portion of one of the upper limb and lower limb is engagable with the central engagement portion of the other of the upper limb and lower limb such that the upper limb and the lower limb are rotatable relative to each other to one of a plurality of operational positions about a rotation axis extending through the central engagement portion of each of the upper limb and the lower limb; and wherein the central engagement portions are configured such that their bearing surfaces while engaged are at least partially raised relative to the general planes of the upper and lower limbs, the bearing surfaces configured to partially constrain rotation of the upper and lower limbs with respect to each other.

16. The anchor assembly according to claim 15, wherein the central engagement portion of at least one of the upper limb and the lower limb is raised relative to the pair of elongate portions of at least one of the upper limb and the lower limb.

17. The anchor assembly according to claim 15, wherein each of the upper limb and the lower limb comprises dished portions extending from opposed ends of the pair of elongate portions.

18. The anchor assembly according to claim 15, further comprising an anchor structure connected to the upper limb and the lower limb, wherein the anchor structure comprises a connection ring, and an energy absorber device.

19. An anchor assembly comprising:

first and second mounting limbs each comprising a concentric engagement portion;

wherein the concentric engagement portion of one of the first and second mounting limbs is configured to nest with the concentric engagement portion of the other of the first and second mounting limbs such that the first and second mounting limbs are rotatable relative to each other about a rotation axis extending through the concentric engagement portion of each of the first and second mounting limbs; and wherein the nesting of the concentric engagement portions partially constrains rotation of the mounting limbs with respect to each other.

20. An anchor assembly comprising:

first and second mounting limbs each comprising a concentric engagement portion having a bearing surface;

wherein the concentric engagement portion of one of the first and second mounting limbs is engagable with the concentric engagement portion of the other of the first and second mounting limbs such that the first and second mounting limbs are rotatable relative to each other about a rotation axis extending through the concentric engagement portion of each of the first and second mounting limbs; and wherein the concentric engagement portions are configured such that their bearing surfaces while engaged are at least partially raised relative to the general planes of the engaged limbs, the bearing surfaces configured to partially constrain rotation of the engaged limbs with respect to each other.

21. The anchor assembly according to claim 1, wherein the projected area of one of the first and second mounting limbs onto the other of the first and second mounting limbs is annular.

* * * * *